United States Patent
Yoshimoto

(10) Patent No.: US 8,425,068 B2
(45) Date of Patent: Apr. 23, 2013

(54) LIQUID CRYSTAL DISPLAY DEVICE, BACKLIGHT CONTROL METHOD AND PROGRAM

(75) Inventor: Takeshi Yoshimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 12/770,003

(22) Filed: Apr. 29, 2010

(65) Prior Publication Data

US 2010/0309650 A1    Dec. 9, 2010

(30) Foreign Application Priority Data

Jun. 3, 2009    (JP) .................................. 2009-133618

(51) Int. Cl.
*G09F 13/04* (2006.01)

(52) U.S. Cl.
USPC ............ 362/97.2; 362/97.1; 362/85; 362/602

(58) Field of Classification Search .................. 362/600, 362/602, 85, 97.1, 97.2
See application file for complete search history.

(56) References Cited

U.S. PATENT DOCUMENTS

| 6,191,408 | B1 | 2/2001 | Shinotsuka et al. |
| 2004/0246434 | A1 | 12/2004 | Ohashi et al. |
| 2005/0275616 | A1 | 12/2005 | Park et al. |
| 2006/0151678 | A1 | 7/2006 | Shibata |
| 2006/0181673 | A1 | 8/2006 | Ohashi et al. |
| 2007/0158428 | A1* | 7/2007 | Havens et al. ........... 235/462.45 |
| 2008/0094347 | A1 | 4/2008 | Lee et al. |
| 2008/0180381 | A1 | 7/2008 | Jeong et al. |

FOREIGN PATENT DOCUMENTS

| EP | 1 445 643 A1 | 8/2004 |
| EP | 1 605 342 A2 | 12/2005 |
| EP | 1 950 728 A2 | 7/2008 |
| JP | 2006-139216 A | 6/2006 |
| JP | 2009-63803 | 3/2009 |

OTHER PUBLICATIONS

European Search Report issued on Jun. 15, 2011 in corresponding European Application No. 10 16 4068.

* cited by examiner

*Primary Examiner* — Evan Dzierzynski
*Assistant Examiner* — Danielle Allen
(74) *Attorney, Agent, or Firm* — Oblon, Spivak, McClelland, Maier & Neustadt, L.L.P.

(57) ABSTRACT

A liquid crystal display device includes an input and output display unit which includes a touch panel function; a backlight which emits light to the input and output display unit from a rear surface thereof; a comparison processing unit which compares a sensor output of a sensor which detects the light emitted from the backlight and reflected from a manipulation object on the input and output display unit with a predetermined reference value; and a backlight luminance adjusting unit which receives a comparison result of the comparison processing unit and adjusts luminance of the backlight so that the sensor output is close to a predetermined allowable lower limit output value.

14 Claims, 6 Drawing Sheets

LIQUID CRYSTAL DISPLAY DEVICE, BACKLIGHT CONTROL METHOD AND PROGRAM

BACKGROUND OF THE INVENTION

1. Field of the Invention

The present invention relates to a liquid crystal display device, a backlight control method and a program, and more particularly, to a liquid crystal display device, a backlight control method and a program, which can control luminance of a backlight in the liquid crystal display device having a touch panel function to reduce power consumption.

2. Description of the Related Art

A liquid crystal display device is a light flat display device, and for example, is widely used for optical touch panels such as a display for cameras, portable information processing apparatuses, bank terminals or the like. Since the liquid crystal display device is a non-light-emitting display, a backlight for illuminating a display screen from a back side thereof is used to enhance visibility and allow usage in a dark place. A fluorescent tube, an LED or the like is used as the backlight.

In a case where a display unit of the liquid crystal display device is used as an input unit of a touch panel type, a finger of a user or a stylus pen which is an input device of a pen type is put in contact with or close to a surface of a liquid crystal panel. In such a touch panel type liquid crystal display device, a position is detected in which such a finger or stylus pen is in contact with or close to the surface of the liquid crystal panel.

More specifically, light emitted from a backlight is reflected from an object, that is, the finger or stylus pen which is in contact with or close to an upper part of the panel, and the reflected light is detected by a sensor (detecting element) which is installed inside of the liquid crystal panel, to thereby determine an input position or area. A variety of data processes are performed according to the determination. Regarding the touch panel type liquid crystal display device is disclosed, for example, in Japanese Unexamined Patent Application Publication No. 2009-63803.

Hereinafter, a configuration example of a liquid crystal display device of an optical touch panel type will be described with reference to FIG. 1. An input and output display panel 11 which is shown in an upper left side is a panel having functions of a display unit and a sensor. In a sectional view which is shown in a lower left section, a backlight 12 which is made of a fluorescent tube, an LED or the like is arranged on a rear surface of the input and output display panel 11.

If a finger of a user or the like comes in contact with the input and output display panel 11, sensor detected information is input to a sensor detection information input unit 21. The sensor detection information input unit 21 outputs information on a position in which an object such as a finger is contacted to a data processing unit 22. The data processing unit 22 performs data processing corresponding to a predetermined contact position. For example, a process of changing display data or the like is performed. A command for changing the display data is output from a display control unit 23. The display control unit 23 performs the process of changing the display data of the input and output display panel 11 according to an input from the data processing unit 22.

On the other hand, there is a control processing system of the backlight 12, in addition to the data processing system. A backlight luminance adjusting unit 31 adjusts luminance of the backlight. A backlight light emitting control unit 32 performs an ON/OFF control for a turn-on and turn-off process of the backlight. The backlight is set to an interface of a touch panel type, and is set to repeat turn-on and turn-off (ON/OFF) at a short interval. Accordingly, detection accuracy for a contact position with respect to the panel is enhanced. The backlight light emitting control unit 32 performs the ON/OFF control.

In the input and output display panel 11 having such a sensor, it is known that sensitivity change occurs due to temperature characteristics and secular change of sensitivity of the sensor. Thus, luminance (light intensity) of the backlight 12 is preset to a large value so that contact of a finger or the like can be sufficiently detected even in the case where the sensitivity of the sensor is changed to be lowered and the detection sensitivity is predicted to the minimum.

That is, the backlight luminance adjusting unit 31 is adjusted to be supplied with high electric current so that the luminance of the backlight is preset to a high degree, in order to obtain a sufficient light intensity even though the sensitivity of the sensor is lowered due to the secular change. Thus, in an initial state, excessive power higher than originally necessary power is supplied, and thus, excessive power consumption occurs.

Further, it is similarly known that sensitivity of the sensor is lowered due to temperature change. Thus, the backlight luminance adjusting unit 31 is adjusted so that the luminance of the backlight is preset to a high degree, in order to obtain a sufficient light intensity even though the sensitivity of the sensor is lowered due to the temperature change. Thus, for example, in a state where there is high temperature such as summer, excessive power higher than originally necessary power is supplied, and thus, excessive power consumption occurs.

SUMMARY OF THE INVENTION

An advantage of some embodiment of the invention is to provide a liquid crystal display device, a backlight control method and a program which can perform a backlight control of the liquid crystal display device having a touch panel function to reduce power consumption.

According to an embodiment of the invention, there is provided a liquid crystal display device including: an input and output display unit which includes a touch panel function; a backlight which emits light to the input and output display unit from a rear surface thereof; a comparison processing unit which compares a sensor output of a sensor which detects the light emitted from the backlight and reflected from a manipulation object on the input and output display unit with a predetermined reference value; and a backlight luminance adjusting unit which receives a comparison result of the comparison processing unit and adjusts luminance of the backlight so that the sensor output is close to a predetermined allowable lower limit output value.

In an embodiment of the liquid crystal display device according to the invention, the backlight luminance adjusting unit may adjust the luminance of the backlight under the control of an electric current value which is output to the backlight.

In an embodiment of the liquid crystal display device according to the invention, the backlight luminance adjusting unit may receive a difference value between the sensor output and the reference value as the comparison result of the comparison processing unit, and calculate the electric current value which is output to the backlight by applying the received difference value.

In an embodiment of the liquid crystal display device according to the invention, the backlight luminance adjusting unit may adjust the luminance of the backlight by changing setting of a PWM signal for controlling the electric current value which is output to the backlight.

In an embodiment of the liquid crystal display device according to invention, the backlight luminance adjusting unit may receive a difference value between the sensor output and the reference value as the comparison result of the comparison processing unit, calculate setting information of the PWM signal by applying the received difference value, and perform the electric current control according to the PWM signal changed by the calculated setting information, to adjust the luminance of the backlight.

According to another embodiment of the invention, there is provided a backlight control method which is performed in a liquid crystal display device, including the steps of: comparing a sensor output of a sensor which detects light emitted from a backlight and reflected from a manipulation object on an input and output display unit having a touch panel function with a predetermined reference value, by a comparison processing unit; and receiving a comparison result of the comparison processing unit and adjusting luminance of a backlight so that the sensor output is close to a predetermined allowable lower limit output value, by a backlight luminance adjusting unit.

According to a still another embodiment of the invention, there is provided a program for executing a backlight control process in a liquid crystal display device, including the steps of: comparing a sensor output of a sensor which detects light emitted from a backlight and reflected from a manipulation object on an input and output display unit having a touch panel function with a predetermined reference value, in a comparison processing unit; and receiving a comparison result of the comparison processing unit and adjusting luminance of a backlight so that the sensor output is close to a predetermined allowable lower limit output value, in a backlight luminance adjusting unit.

The program according to the invention may be provided, for example, as a storage medium or a communication medium which is provided in a computer-readable manner with respect to an image processing apparatus or a computer system which is capable of performing a variety of program codes. By providing such a program in the computer-readable manner, a process corresponding to the program is performed in the image processing apparatus or the computer system.

Other objects, features and advantages of the invention will be apparent by detailed description based on embodiments of the invention and accompanying drawings. In the description, a system has a configuration that a plurality of apparatuses is logically combined, and is not limited to a configuration that respective apparatuses are installed inside of the same casing.

According to the embodiments of the invention, in the liquid crystal display device which performs data display according to backlight illumination, the sensor output of the sensor which detects the light emitted from the backlight and reflected from the manipulation object on the input and output display unit of the touch panel type is compared with the predetermined reference value, and the luminance of the backlight is adjusted so that the sensor output is close to the predetermined allowable lower limit output value, using the comparison result. With this configuration, it is not necessary to perform setting of high backlight luminance in consideration of lowering of the sensor output, for example, due to the secular change or temperature change, and it is possible to reduce power consumption while securing a sufficient sensor output.

DESCRIPTION OF THE PREFERRED EMBODIMENTS

Hereinafter, a liquid crystal display device, a backlight control method and a program according to exemplary embodiments of the present invention will be described with reference to accompanying drawings.

The embodiments of the invention will be described in the following order.

Figure 2:
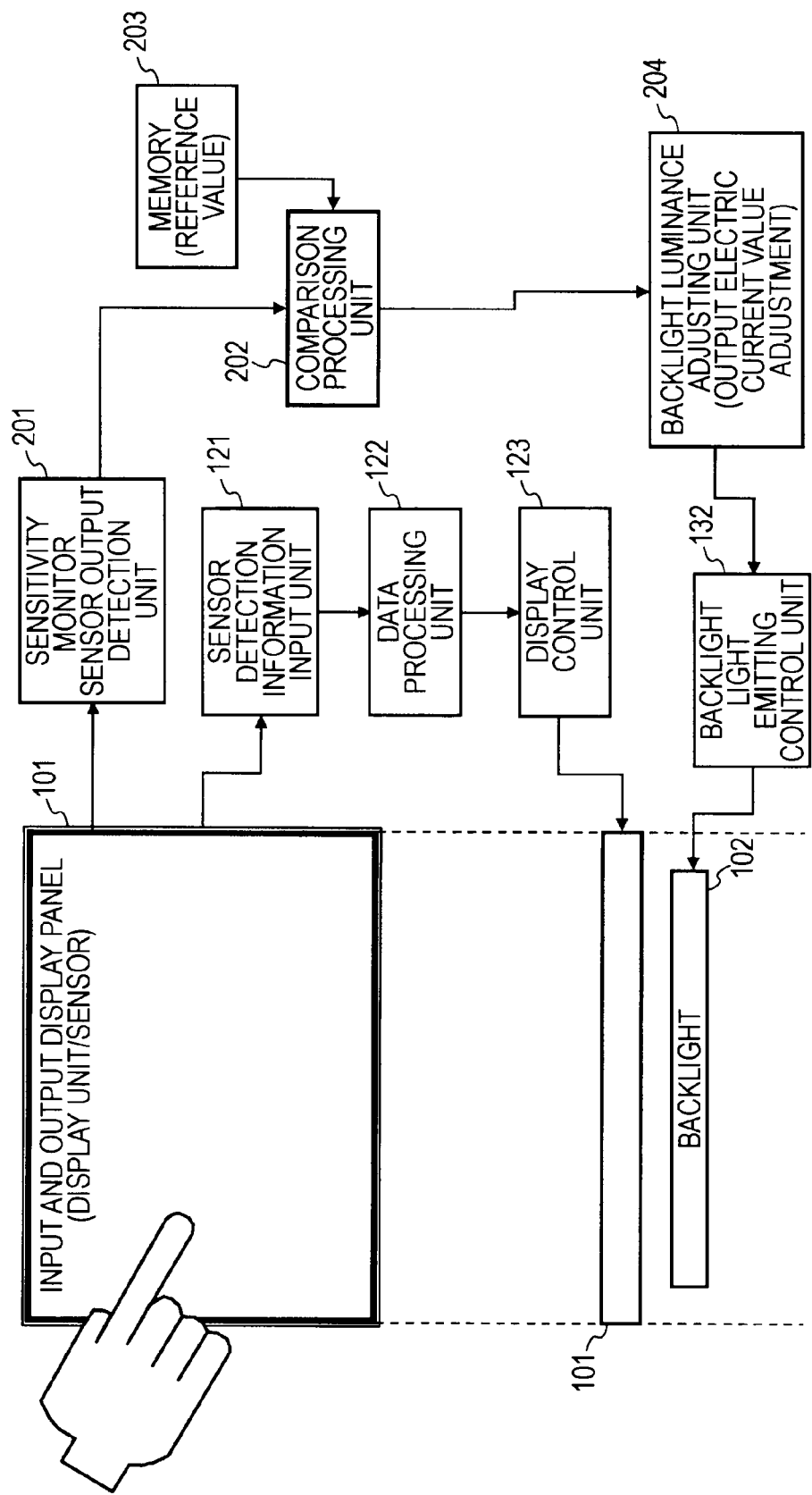
FIG. 2 is a diagram for illustrating an example of a configuration of a liquid crystal display device of a touch panel type according to an embodiment of the invention.

1. A configuration example and a process example of a liquid crystal display device according to a first embodiment of the invention 2. A configuration example and a process example of a liquid crystal display device according to a second embodiment of the invention 1. A Configuration Example and a Process Example of a Liquid Crystal Display Device According to a First Embodiment of the Invention A configuration example and a process example of a liquid crystal display device according to a first embodiment of the invention will be described with reference to FIG. 2 and below. FIG. 2 illustrates the configuration example of the liquid crystal display device according to the first embodiment of the invention.

Figure 1:
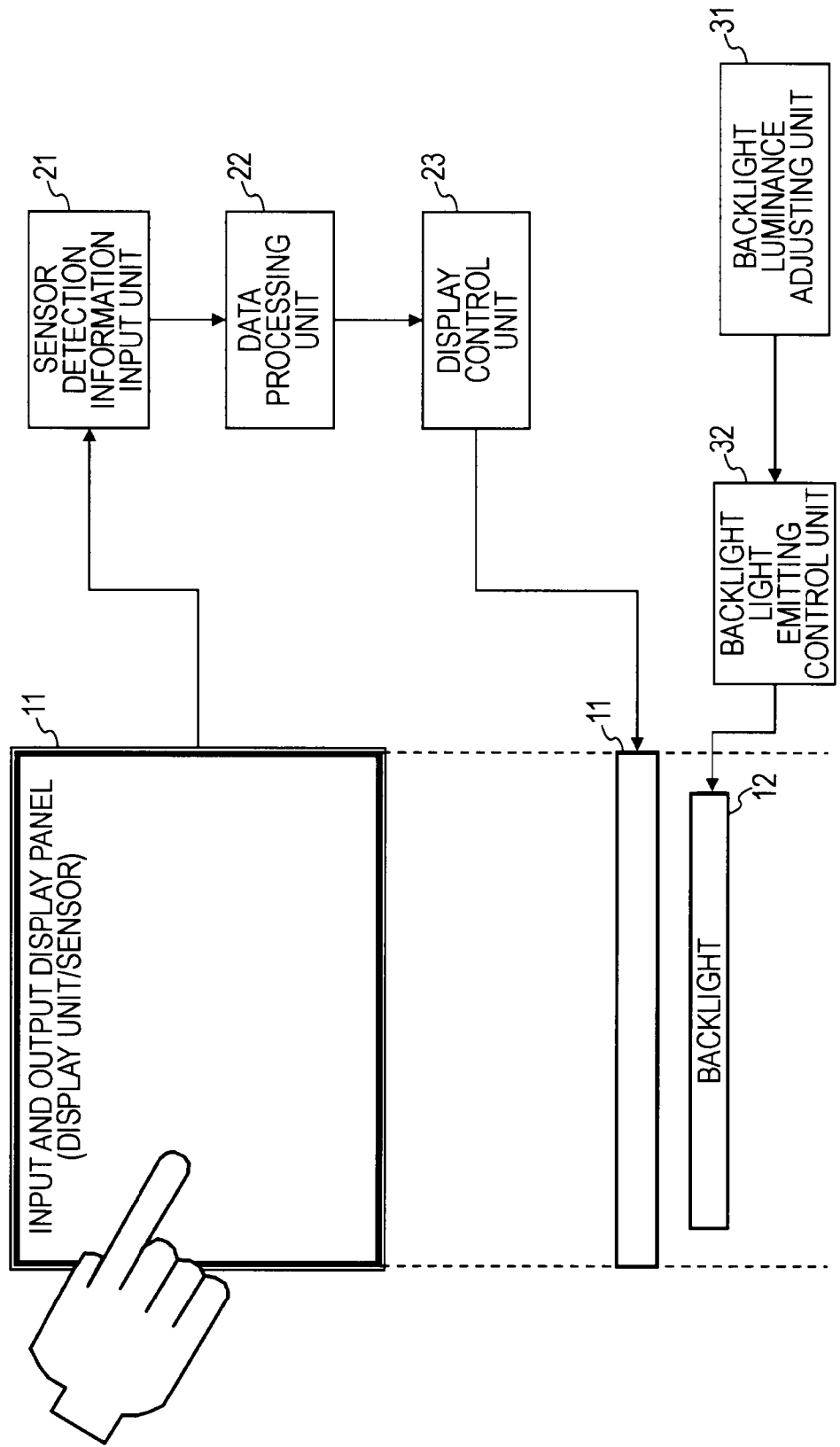
FIG. 1 is a diagram for illustrating an example of a general configuration of a liquid crystal display device of a touch panel type.

A basic configuration other than a backlight control in the liquid crystal display device of a touch panel type as shown in FIG. 2 is the same as that of the liquid crystal display device of the optical touch panel type as described with reference to FIG. 1. An input and output display panel 101 is a panel having functions of a display unit and a sensor. Referring to a sectional view in a lower left section in the figure, a backlight 102 which includes a fluorescent tube, an LED or the like is arranged on a rear surface of the input and output display panel 101.

If a finger of a user or the like comes in contact with the input and output display panel 101, sensor detecting information is input to a sensor detection information input unit 121. In the input and output display panel 101 is installed a sensor for detecting light which is emitted from the backlight and reflected from a manipulation object on the input and output display panel.

The sensor detection information input unit 121 outputs contact position information to a data processing unit 122. The data processing unit 122 performs data processing corresponding to a predetermined contact position. For example, the data processing unit 122 performs a process of changing display data, or the like. A command for changing the display data is output to a display control unit 123. The display control unit 123 performs the process of changing the display data of the input and output display panel 101 according to an input from the data processing unit 122.

On the other hand, a control processing system of the backlight 102 is different from that of the configuration as described with reference to FIG. 1.

A backlight luminance adjusting unit 204 adjusts luminance of the backlight 102. A backlight light emitting control unit 132 performs an ON/OFF control of the backlight. As described above, the backlight is set to a touch panel type interface and is set to repeat turning-on and turning-off (ON/OFF) at a short interval. Accordingly, detection accuracy of a contact position with respect to the panel is enhanced. The backlight light emitting control unit 132 performs such an ON/OFF control.

In the liquid crystal display device as described with reference to FIG. 1, luminance of an excessive intensity is preset in consideration of lowering of detection accuracy of the sensor due to the secular change or the temperature change in the backlight luminance adjusting unit 31, thereby causing excessive power consumption.

In the liquid crystal display device as shown in FIG. 2, in order to prevent unnecessary power consumption, a backlight luminance adjusting unit 204 adjusts the luminance of the backlight to be optimized according to surrounding conditions. This process is described below.

A sensitivity monitor sensor is installed in the input and output display panel 101. The sensitivity monitor sensor may use a part of a sensor which is normally used, or may use a sensor which is different from the normal sensor, which may be installed, for example, in an outer periphery or circumference of a display region.

A sensitivity monitor sensor output detection unit 201 shown in FIG. 2 detects an output of the sensitivity monitor sensor. The detected output value of the sensitivity monitor sensor is input to a comparison processing unit 202.

The comparison processing unit 202 compares the output value with a reference value which is stored in a memory 203. The reference value is a value which is preset to obtain an output value (difference value (X)) of the comparison processing unit 202 which is applied to determine an optimal backlight luminance adjusting current in the backlight luminance adjusting unit 204. The reference value is stored in advance in the memory 203.

The backlight luminance adjusting unit 204 receives the "difference value X between the sensitivity monitor sensor output and the reference value" which is calculated in the comparison processing unit 202, and determines optimal luminance of the backlight on the basis of the difference value X. More specifically, the luminance of the backlight is adjusted so that the sensor output is close to a predetermined allowable lower limit output value. That is, the luminance of the backlight 102 is adjusted at such a level that the monitor sensor output value corresponding to an allowable sensor output value of a necessary minimum level can be obtained.

The backlight luminance adjusting unit 204 determines a value of electric current to be output to the backlight 102 and outputs the electric current to the backlight 102. The process of determining the output electric current value I is performed as follows.

A value obtained as a comparison result of the comparison processing unit 202 is represented as X. That is, (reference value−sensitivity monitor sensor output) is X. The difference data (X) is input to the backlight luminance adjusting unit 204. The backlight luminance adjusting unit 204 calculates the output electric current I which is set to adjust the luminance of the backlight, according to the following formula.

$$I=\alpha X \quad \text{(formula 1)}$$

Here, $\alpha$ represents an electric current conversion gain.

If the sensitivity monitor sensor output value becomes large, the difference value X between the reference value and the sensitivity monitor sensor output value becomes a small value, and thus, the output electric current value I ($=\alpha X$) is decreased.

If the sensitivity monitor sensor output value becomes small, the difference value X between the reference value and the sensitivity monitor sensor output value becomes a large value, and thus, the output electric current value I ($=\alpha X$) is increased.

The reference value which is stored in the memory 203 and the parameter $\alpha$ in the formula (formula 1) are set so that the output electric current value I which is set by the backlight luminance adjusting unit 204 can be calculated as an electric current value capable of obtaining a sensor output of an allowable minimum level.

By performing such a backlight luminance adjusting process, it is possible to reduce luminance of the backlight while securing a sensor output which is equal to or more than an allowable level. As a result, power consumption of the backlight 102 can be reduced. According to such a function, it is possible to adjust the luminance of the backlight as necessary, without necessarily maintaining excessive backlight luminance in consideration of lowering of output of the sensor due to the secular change or the temperature change, and it is possible to reduce power consumption while securing a suitable sensor output.

Further, a calculation formula of the output electric current I in the backlight luminance adjusting unit 204 is not limited to the formula ($I=\alpha X$), but other calculation formulas may be applied. For example, the following formula may be applied.

$$I=\beta X+I \quad \text{(formula 2)}$$

Here, $\beta$ is a predetermined parameter.

The output electric current I may be determined according to this formula. In this case, the reference value which is stored in the memory 203 is set so that the output electric current value I which is calculated according to the formula (formula 2) can be calculated as an electric current value capable of obtaining a sensor output of an allowable minimum level.

Further, the backlight luminance adjusting unit 301 may continuously receive the value X obtained as the comparison result of the comparison processing unit 202, and may continuously perform output electric current adjustment according to the received value X, but the backlight luminance adjusting unit 301 may regulate in advance a condition in which adjustment of the output electric current I is performed, so that the adjustment is performed only when satisfying the condition.

For example, only in the case where the difference X between the output of the sensitivity monitor sensor and the reference value is larger than a predetermined threshold value TH1, a process for decreasing an output electric current is performed, and in the case where the difference X is equal to or less than the predetermined threshold value TH1, the adjustment of the output electric current is not performed.

A backlight luminance adjusting sequence according to this embodiment will be described with reference to a flowchart shown in FIG. 3.

Firstly, in step S101, the sensitivity monitor sensor output detection unit 201 detects an output of the sensitivity monitor sensor.

Next, in step S102, the comparison processing unit 202 compares the output of the sensitivity monitor sensor with the reference value which is stored in the memory 203.

Next, in step S103, the backlight luminance adjusting unit 204 receives the comparison result and determines the optimal electric current value I to be output to the backlight 102 on the basis of the comparison value (difference X). This is calculated, for example, using the above described formula (formula 1) or the formula (formula 2).

Finally, in step S104, the backlight luminance adjusting unit 204 outputs the determined electric current value I to the backlight 102 and then performs the backlight luminance adjusting process.

Figure 3:
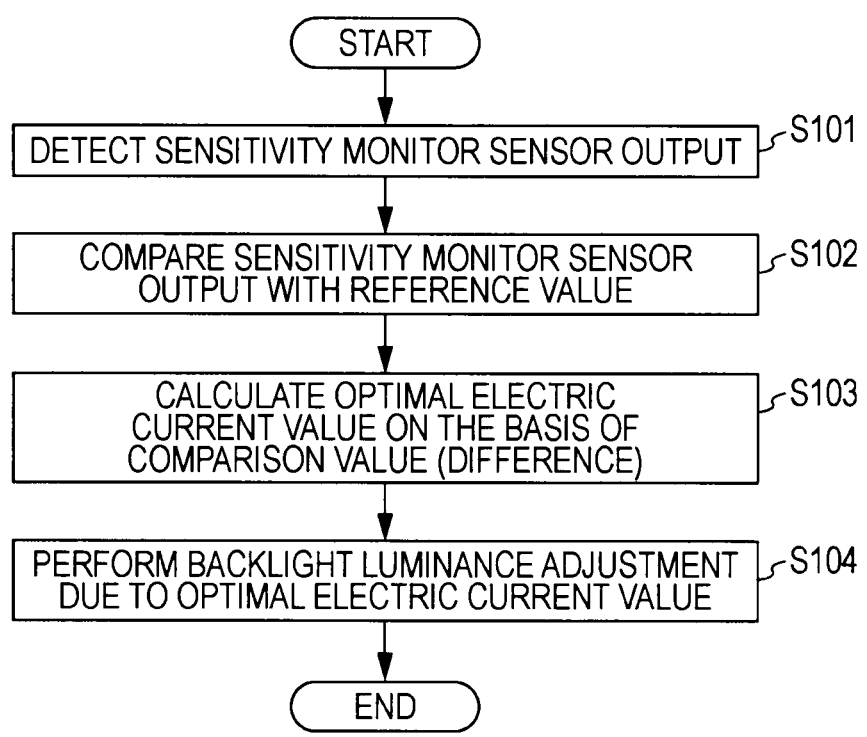
FIG. 3 is a flowchart for illustrating a backlight luminance adjusting sequence in a liquid crystal display device according to an embodiment of the invention.

The process according to the flowchart shown in FIG. 3 may be performed under the control of a controller having a program executing function according to a program which is stored in the memory in the liquid crystal display device.

2. A Configuration Example and a Process Example of a Liquid Crystal Display Device According to a Second Embodiment of the Invention In the above described first embodiment, the electric current value to output to the backlight 102 is directly adjusted to perform luminance adjustment of the backlight.

Hereinafter, a process example according to a second embodiment of the invention in which an output electric current value is changed by PWM (Pulse Wave Modulation) control to perform the luminance adjustment of the backlight will be described.

Figure 4:
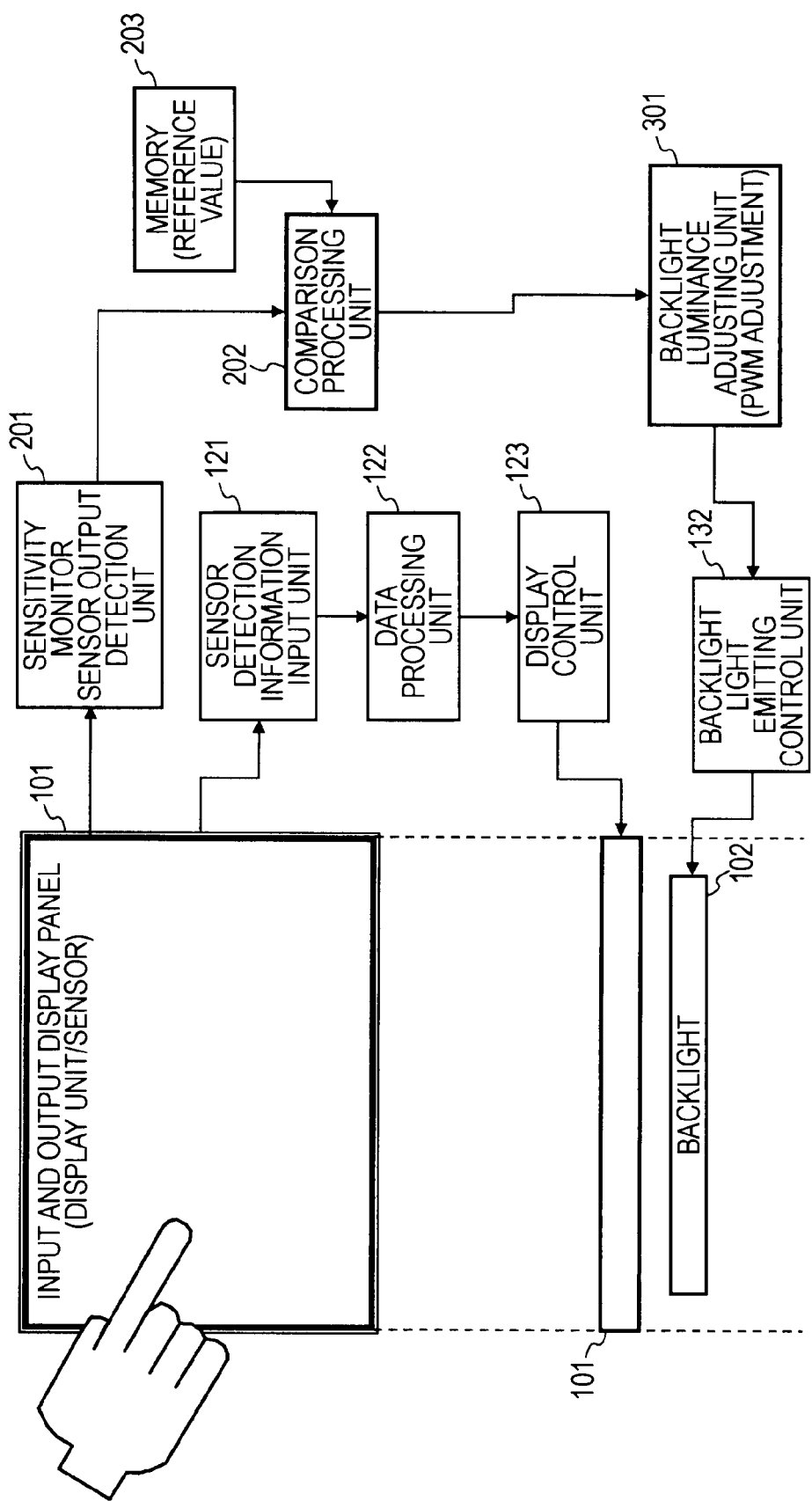
FIG. 4 is a diagram for illustrating an example of a configuration of a liquid crystal display device of a touch panel type according to an embodiment of the invention.

FIG. 4 is a diagram for illustrating an example of a configuration of the liquid crystal display device according to the second embodiment of the invention. The basic configuration other than a backlight control of the liquid crystal display device of a touch panel type shown in FIG. 4 is the same as in the liquid crystal display device of the touch panel type exemplified in FIG. 1. An input and output display panel 101 is a panel having functions of a display unit and a sensor. Referring to a sectional view illustrated on a lower left section in FIG. 4, a backlight 102 which is formed of a fluorescent tube, LED or the like is arranged on a rear surface of the input and output display panel 101.

If a finger of a user or the like comes in contact with the input and output display panel 101, sensor detected information is input to a sensor detection information input unit 121. In the input and output display panel 101 is installed a sensor for detecting light which is emitted from the backlight and reflected from a manipulation object on the input and output display panel.

The sensor detection information input unit 121 outputs contact position information to a data processing unit 122. The data processing unit 122 performs data processing corresponding to a predetermined contact position. For example, the data processing unit 122 performs a process of changing display data, or the like. A command for changing the display data is output to a display control unit 123. The display control unit 123 performs the process of changing the display data of the input and output display panel 101 according to an input from the data processing unit 122.

On the other hand, a control processing system of the backlight 102 is different from that of the configuration as described with reference to FIG. 1. A backlight luminance adjusting unit 301 adjusts luminance of the backlight 102. A backlight light emitting control unit 132 performs an ON/OFF control of the backlight. As described above, the backlight which is set to a touch panel type interface is set to repeat turning-on and turning-off (ON/OFF) at a short interval. Accordingly, detection accuracy of a contact position with respect to the panel is enhanced. The backlight light emitting control unit 132 performs such an ON/OFF control.

In the liquid crystal display device as described with reference to FIG. 1, luminance of an excessive intensity is preset in consideration of lowering of detection accuracy of the sensor due to the secular change or the temperature change in the backlight luminance adjusting unit 31, thereby causing excessive power consumption.

In the liquid crystal display device as shown in FIG. 4, in order to prevent unnecessary power consumption, the backlight luminance adjusting unit 301 adjusts the luminance of the backlight to be optimized according to surrounding conditions. Hereinafter, this process will be described.

A sensitivity monitor sensor is installed in the input and output display panel 101. The sensitivity monitor sensor may use a part of a sensor which is normally used, or may use a sensor which is different from the normal sensor, which may be installed, for example, in an outer periphery or circumference of a display region.

A sensitivity monitor sensor output detection unit 201 shown in FIG. 4 detects an output of the sensitivity monitor sensor thereof. The detected output value of the sensitivity monitor sensor is input to a comparison processing unit 202.

The comparison processing unit 202 compares the output value with a reference value which is stored in a memory 203 in advance. The reference value is a value which is preset to obtain an output value (difference value (X)) of the comparison processing unit 202 which is applied to determine an optimal backlight luminance adjusting electric current in the backlight luminance adjusting unit 301. The reference value is stored in advance in the memory 203.

The backlight luminance adjusting unit 301 receives [the difference value X between the sensitivity monitor sensor output and the reference value] which is calculated in the comparison processing unit 202, and determines optimal luminance of the backlight on the basis of the difference value X. More specifically, the luminance of the backlight is adjusted so that the sensor output is close to a predetermined allowable lower limit output value. That is, the luminance of the backlight 102 is adjusted at such a level that the monitor sensor output value corresponding to an allowable sensor output value of a necessary minimum level can be obtained.

In this embodiment, the backlight luminance adjusting unit 301 determines a PWM (Pulse Wave Modulation) signal for controlling an electric current to be output to the backlight 102.

Figure 5:
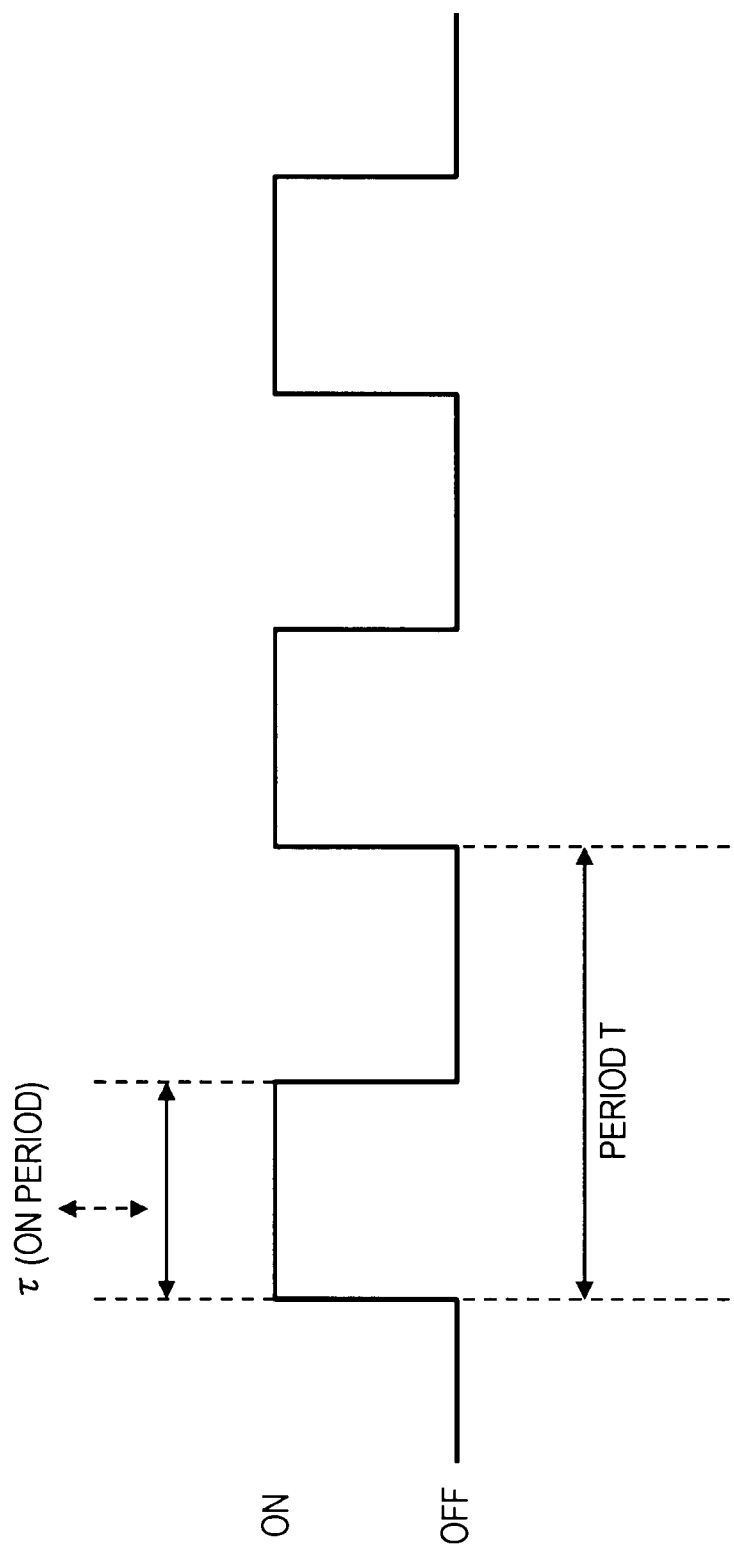
FIG. 5 is a diagram for illustrating a control example using PWM for backlight luminance adjustment in a liquid crystal display device according to an embodiment of the invention.

The PWM signal is a pulse signal which is alternately repeated between an ON period and an OFF period, as shown in FIG. 5, and performs an electric current control by outputting a predetermined electric current during only the ON period. If the ON period becomes long, the electric current value becomes increased, and if the ON period becomes short, the electric current value becomes decreased.

For example, the PWM signal for output electric current adjustment in the backlight luminance adjusting unit 301 is adjusted as follows.

As shown in FIG. 5, a period of the PWM signal is represented as T, and the ON period is represented as $\tau$.

The value obtained as the comparison result of the comparison processing unit 202 is represented as X. That is, (reference value−sensitivity monitor sensor output) is X.

The difference data X is input to the backlight luminance adjusting unit 301.

The backlight luminance adjusting unit 301 calculates the ON period $\tau$ of the PWM signal which is set for adjusting the backlight luminance using the following formula.

$$\tau = \gamma X \quad \text{(formula 3)}$$

Here, γ is a conversion parameter.

If the sensitivity monitor sensor output value becomes large, (reference value−sensitivity monitor sensor output)=X becomes a small value, and the ON period of the PWM signal τ=γX is decreased, and thus, the electric current supplied to the backlight is decreased.

If the sensitivity monitor sensor output value becomes small, (reference value−sensitivity monitor sensor output)=X becomes a large value, and the ON period of the PWM signal τ=γX is increased, and thus, the electric current supplied to the backlight is increased.

The reference value which is stored in the memory 203 and the parameter γ in the formula (formula 3) are set so that the electric current I which is output according to the ON period τ of the PWM signal which is set by the backlight luminance adjusting unit 301 can be an electric current value for obtaining a sensor output of an allowable minimum level.

By performing such a backlight luminance adjusting process, it is possible to reduce luminance of the backlight while securing a sensor output which is equal to or more than an allowable level. As a result, power consumption of the backlight 102 can be reduced. According to such a function, it is possible to adjust the luminance of the backlight as necessary, without necessarily maintaining excessive backlight luminance in consideration of lowering of output of the sensor due to the secular change or the temperature change, and it is possible to reduce power consumption while securing a suitable sensor output.

Further, similar to the first embodiment, a calculation formula of the ON period τ of the PWM signal in the backlight luminance adjusting unit 301 is not limited to the formula (τ=γX), but other calculation formulas may be applied. For example, the following formula may be applied.

$$\tau = \delta X + \tau \quad \text{(formula 4)}$$

Here, δ is a predetermined parameter.

The ON period τ of the PWM signal may be determined according to this formula. In this case, the reference value which is stored in the memory 203 is set so that the electric current I which is output for the ON period τ of the PWM signal which is calculated according to the formula (formula 4) can be an electric current value for obtaining a sensor output of an allowable minimum level.

Further, similar to the first embodiment, the backlight luminance adjusting unit 301 may continuously receive the value X which is obtained as the comparison result of the comparison processing unit 202, and may continuously perform output electric current adjustment according to the input value X, but the backlight luminance adjusting unit 301 may regulate in advance a condition in which adjustment is performed, so that the adjustment is performed only when satisfying the condition.

For example, only in the case where the difference X between the output of the sensitivity monitor sensor and the reference value is larger than a predetermined threshold value TH2, a process for decreasing an output electric current is performed, and in the case where the difference X is equal to or less than the predetermined threshold value TH2, the adjustment of the output electric current may not be performed.

A backlight luminance adjusting sequence according to this embodiment will be described with reference to a flowchart shown in FIG. 6.

Firstly, in step S201, the sensitivity monitor sensor output detection unit 201 detects an output of the sensitivity monitor sensor.

Next, in step S202, the comparison processing unit 202 compares the output of the sensitivity monitor sensor with the reference value which is stored in the memory 203.

Next, in step S203, the backlight luminance adjusting unit 301 receives the comparison result and determines the ON period τ of the PWM signal to be output to the backlight 102 on the basis of the comparison value (difference X). This is calculated, for example, using the above described formula (formula 3) or the formula (formula 4).

Finally, in step S204, the backlight luminance adjusting unit 301 outputs the control electric current according to the PWM signal, in which the determined ON period τ of the PWM signal is set, to the backlight 102 and performs the backlight luminance adjusting process.

Figure 6:
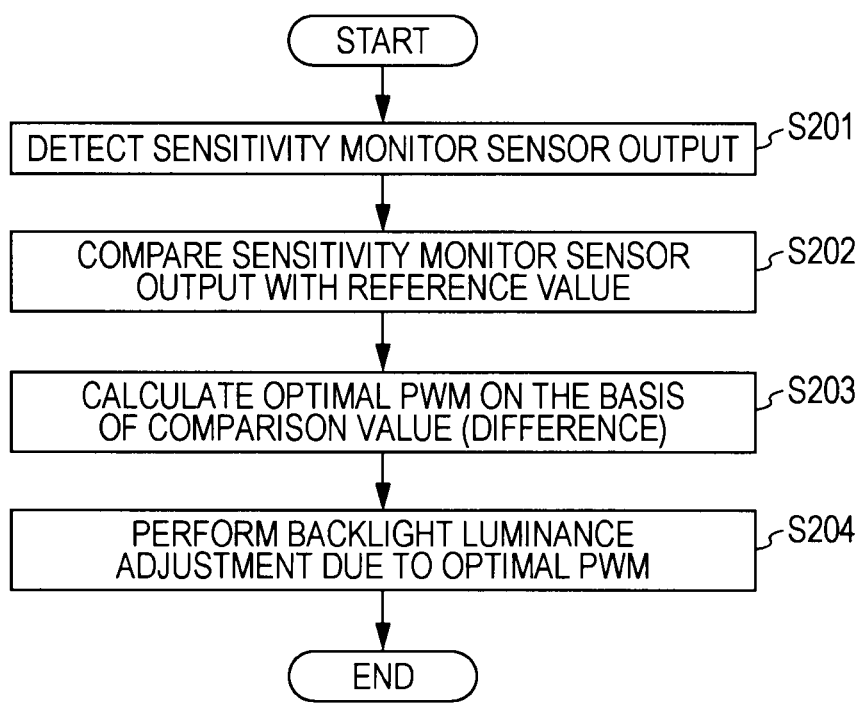
FIG. 6 is a flowchart for illustrating a backlight luminance adjusting sequence in a liquid crystal display device according to an embodiment of the invention.

The process according to the flowchart shown in FIG. 6 may be performed under the control of a controller having a program executing function according to a program which is stored in the memory in the liquid crystal display device.

Hereinbefore, the invention has been described with reference to the specific embodiments. However, it is obvious that those skilled in the art can make modifications or substitutions from the embodiments without departing from the spirit of the invention. That is, the invention should not be interpreted to be limited to the exemplary embodiments. The scope of the invention should be defined with reference to the accompanying claims.

Further, the series of processes described in the above description may be performed by hardware, software or a combination thereof. In the case where the process is performed by the software, a program in which a process sequence is recorded may be installed and executed in a memory in a computer which is assembled in specially used hardware, or may be installed and executed in a general-purpose computer which is capable of performing a variety of processes. For example, the program may be recorded in a recording medium in advance. The program may be installed to the computer from a recording medium, may be received through a network such as LAN (Local Area Network) or the Internet, or may be installed in a recording medium such as a built-in hard disc.

The variety of processes as described above may be performed in the described order in a time series manner, or may be performed in parallel or individually according to a processing ability of a processing apparatus or as necessary. Further, the system in the embodiments has a configuration that a plurality of apparatuses is logically combined, and is not limited to a configuration that respective apparatuses are installed inside of the same casing.

The present application contains subject matter related to that disclosed in Japanese Priority Patent Application JP 2009-133618 filed in the Japan Patent Office on Jun. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
    an input and output display unit which includes a touch panel function;
    a backlight which emits light to the input and output display unit from a rear surface thereof;
    a light detection sensor which detects the light emitted from the backlight and reflected from a manipulation object on the input and output display unit;

a comparison processing unit which compares a output of the light detection sensor with a predetermined reference value; and a backlight luminance adjusting unit which receives a comparison result of the comparison processing unit and adjusts luminance of the backlight so that the sensor output is close to a predetermined allowable lower limit output value.

2. The liquid crystal display device according to claim 1, wherein the backlight luminance adjusting unit adjusts the luminance of the backlight under the control of an electric current value which is output to the backlight.

3. The liquid crystal display device according to claim 2, wherein the backlight luminance adjusting unit receives a difference value between the sensor output and the reference value as the comparison result of the comparison processing unit and calculates the electric current value which is output to the backlight by applying the received difference value.

4. The liquid crystal display device according to claim 1, wherein the backlight luminance adjusting unit adjusts the luminance of the backlight by changing setting of a PWM signal for controlling the electric current value which is output to the backlight.

5. The liquid crystal display device according to claim 4, wherein the backlight luminance adjusting unit receives a difference value between the sensor output and the reference value as the comparison result of the comparison processing unit, calculates setting information of the PWM signal by applying the received difference value, and performs the electric current control according to the PWM signal changed by the calculated setting information, to adjust the luminance of the backlight.

6. A backlight control method which is performed in a liquid crystal display device, comprising the steps of:

emitting light from a backlight to an input and output display unit from a rear surface thereof;

detecting, at a light detection sensor, the light emitted from the backlight and reflected from a manipulation object on the input and output display unit, the input and output display unit having a touch panel function;

comparing a sensor output of a sensor which detects light emitted from a backlight and reflected from a manipulation object on an input and output display unit having a touch panel function with a predetermined reference value, by a comparison processing unit; and receiving a comparison result of the comparison processing unit and adjusting luminance of a backlight so that the sensor output is close to a predetermined allowable lower limit output value, by a backlight luminance adjusting unit.

7. A non-transitory computer-readable medium encoded with computer-readable instructions thereon the computer-readable instructions when executed by a computer cause the computer to perform a method for executing a backlight control process in a liquid crystal display device, the method comprising:

emitting light from a backlight to an input and output display unit from a rear surface thereof;

detecting the light emitted from the backlight and reflected from a manipulation object on the input and output display unit, the input and output display unit having a touch panel function;

comparing an output of the light detection sensor with a predetermined reference value, in a comparison processing unit; and receiving a comparison result of the comparison processing unit and adjusting luminance of a backlight so that the sensor output is close to a predetermined allowable lower limit output value, in a backlight luminance adjusting unit.

8. The liquid crystal display device according to claim 1, wherein the comparison unit continuously compares the light emitted from the backlight and reflected from the manipulation object on the input and output display unit with the predetermined reference value, and the backlight luminance adjusting unit continuously adjusts the luminance of the backlight so that the sensor output is close to the predetermined allowable lower limit output value.

9. The liquid crystal display device according to claim 1, wherein the sensor is arranged on the input and output display unit.

10. The liquid crystal display device according to claim 1 wherein the light emitted from the backlight and reflected from the manipulation object is received through the input and output display device.

11. The liquid crystal display device according to claim 2, wherein the current is adjusted based on a product of a predetermined conversion gain and the comparison result.

12. The liquid crystal display device according to claim 2, wherein the current is adjusted based on a sum of a present current value with a product of the comparison result and a predetermined constant.

13. The liquid crystal display device according to claim 1, wherein the manipulation object is a user finger.

14. The liquid crystal display device according to claim 4, wherein the PWM signal causes the backlight to turn on and off based on a duty cycle thereof.

* * * * *